Jan. 31, 1933.    J. B. PINHEIRO    1,895,677
VEHICULAR TRAVELING BAG
Filed Sept. 8, 1930    3 Sheets-Sheet 1
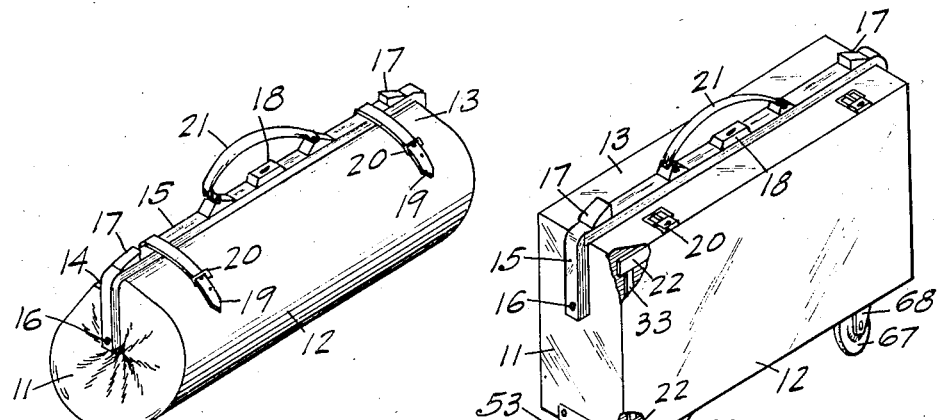
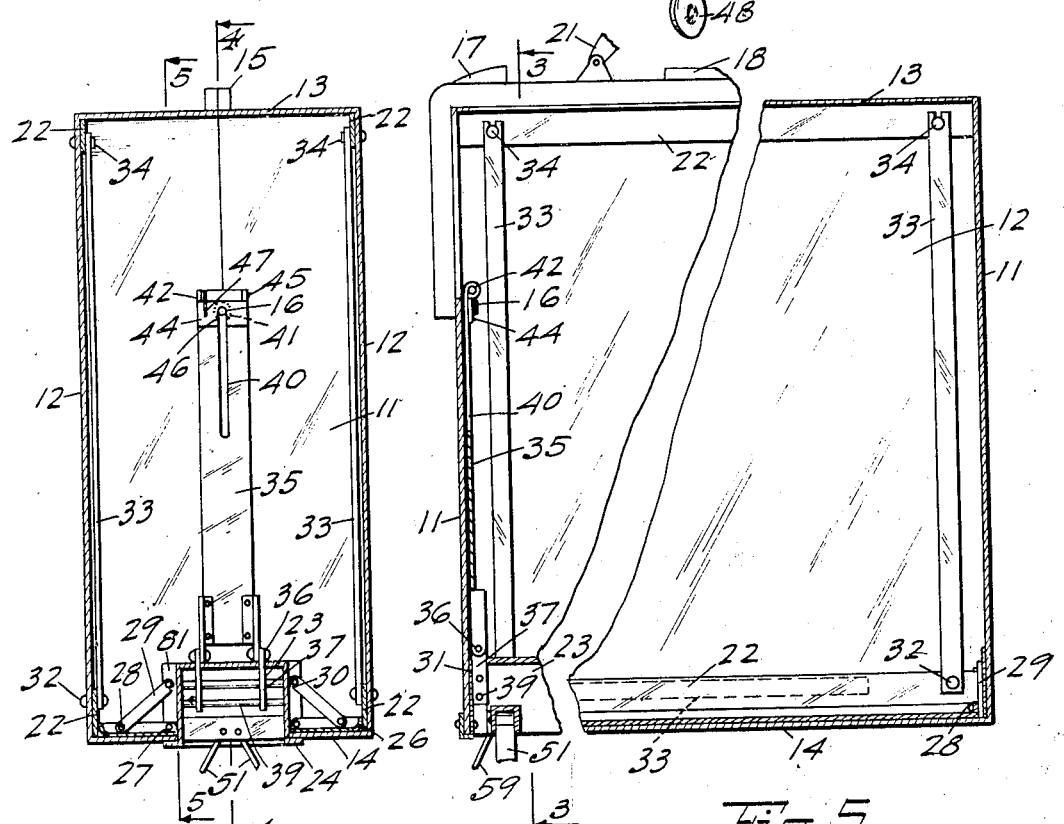
INVENTOR.
John B. Pinheiro
BY
Harry C. Schroeder
ATTORNEYS.

Jan. 31, 1933.  J. B. PINHEIRO  1,895,677
VEHICULAR TRAVELING BAG
Filed Sept. 8, 1930   3 Sheets-Sheet 3

INVENTOR.
John B. Pinheiro
BY
Harry C. Schroeder
ATTORNEYS.

Patented Jan. 31, 1933

1,895,677

UNITED STATES PATENT OFFICE

JOHN B. PINHEIRO, OF OAKLAND, CALIFORNIA

VEHICULAR TRAVELING BAG

Application filed September 8, 1930. Serial No. 480,522.

The invention is for a vehicular traveling bag, the main object of which is to provide a completely collapsible traveling bag, which, when in extended condition may be transported on its own vehicular structure and propelled by means of the usual carrying handle, and which, when in collapsed condition is formed into a compact roll and tied by means of straps, the handles being conveniently presented for carrying the roll.

The invention is adequately illustrated in the accompanying drawings in which

Fig. 1 is a perspective view of the traveling bag in collapsed and rolled condition;

Fig. 2 is a perspective view of the invention in extended or unfolded condition;

Fig. 3 is a sectional elevation taken on line 3—3 of Fig. 4;

Fig. 4 is a fragmentary sectional elevation taken on line 4—4 of Fig. 3.

Fig. 5 is a fragmentary sectional elevation taken on line 5—5 of Fig. 3;

Similar reference characters are used to designate similar parts throughout the several views.

Figure 6:
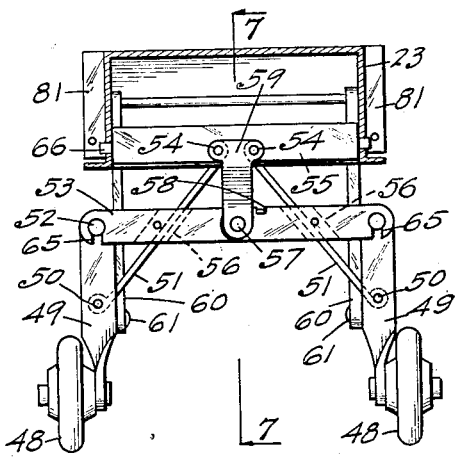
Fig. 6 is a sectional elevation taken on line 6—6 of Fig. 7.
Figure 7:
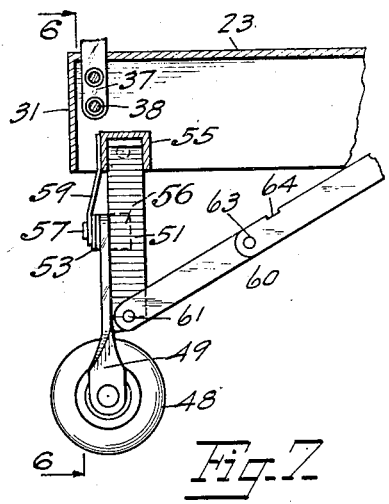
Fig. 7 is a fragmentary sectional elevation taken on line 7—7 of Fig. 6.

The bag proper consists of ends 11, sides 12, top 13, and bottom 14, the clasp 15 being hinged at 16. Latches 17 and lock 18 are adapted to coact between the cooperating members of the clasp 15. Straps 19 and buckles 20 are provided to retain the bag in rolled form as indicated in Fig. 1. A handle 21 is fixed to the external clasp member 15. Flat metal reenforcing strips 22 are provided at the top and bottom longitudinal edges.

A sheet metal housing 23 is inserted in the bottom 14 and is flanged outwardly as at 24 and riveted to the bottom as at 25. Sheet metal false bottoms 26 are hinged to the housing flanges 81 adjacent flanges 24 as at 27 and have pivotally attached to each end, as at 28, the braces 29, a latching slot being provided to engage the latch pin 30 when in open position, the latch pins being fixed in flanges 81 integral with the housing end plates 81. Pivotally attached at one end to the sides 12 and through the reenforcing strips 22, as at 32, at each corner, is a resilient metal reenforcing strip 33 which is provided at its other end with an end slot which is adapted to cooperate with a shouldered rivet 34.

End struts 35 are transversely pivoted at 36 between vertical members 37 which are fixed in position in the housing 23 by means of rivets 38 and spacers 39. An elongated slot 40 terminating in a circular aperture 41 cooperates with shouldered pivot 16 within the bag, the aperture 41 admitting the head of the pivot. Ears 42 are fixed to the upper end of member 35 by means of a rivet 43. A leaf 44 is pivoted at 45 between the ears 42 and has a slot 46 and is adapted to restrict the aperture 41 after insertion of the rivet head 16, and is normally retained against member 35 by the spring 47.

The carriage consists of a two wheel truck at one end and a single wheel truck at the other end of the bag both trucks being foldable within the housing 23. The two wheel truck consists of the wheels 48 pivotally mounted at the end of brackets 49 each of which in turn is pivotally mounted longitudinally relative to the bag at 50 to one end of a strut 51 and releasably secured at 52 to cross member 53. The struts 51 each have their other end pivotally mounted at 54 between cross member 55 in housing 23 and have affixed intermediately by one leg, angle brackets 56, the other leg of which is pivoted to cross member 53. Cross member 53 is formed in two sections pivoted together at 57, and have an engaging stop 58 for limiting the movement relative to each other. A spring finger 59 is provided with an aperture to cooperate with the projecting end of the pivot 57 when the truck is in unfolded position. Folding braces 60 are pivoted to members 49 at 61 and to the cross bar 62 fixed in the sides of housing 23, pivoted together at 63 and provided with a stop 64. The pivotal joint 52 consists of a shouldered rivet fixed in member 49, and a disengaging slot 65 in member 53. Spring finger 59 is fixed to cross members 55 which as a unit is pivoted transversely in the housing 23 as at 66.

The front truck consists of a wheel 67 pivoted in a U shaped bracket 68 which is vertically pivoted at 69 in a bracket 70 which in turn is pivoted by means of a transverse rod 71 fixed between the side walls of the housing 23. Pivotally attached to the bracket 70 as at 72 are hinged braces 73, pivotally connected to the side walls of housing 23 as at 74, a stop being provided at 75 adjacent the hinge pivot 76. A swivel seat 77 is provided with a stop 82 to prevent turning of the pivot 69 through an angle greater than 90 degrees.

A locking disc 78 is pivotally connected to a cross bracket 79 and is provided with slots 80 which are adapted to register with the wheels 48 and 67 and which, by turning, prevents unfolding of the trucks.

Figure 8:
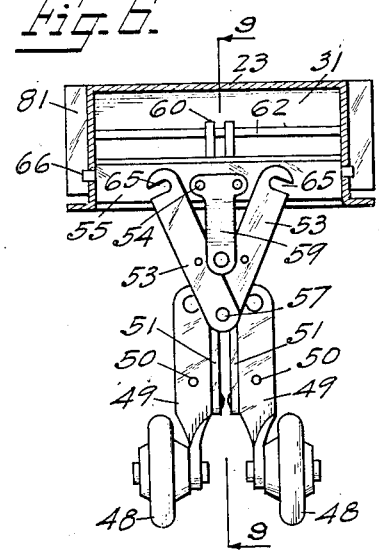
Fig. 8 is a sectional elevation similar to Fig. 6 showing the wheel structure folded together.
Figure 9:
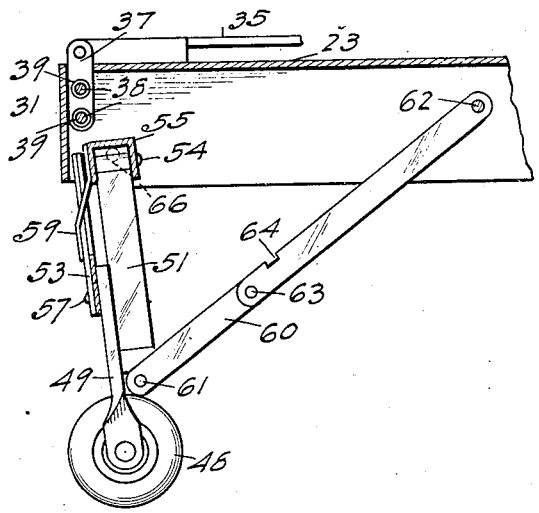
Fig. 9 is a sectional elevation taken on line 9—9 of Fig. 8.
Figure 10:
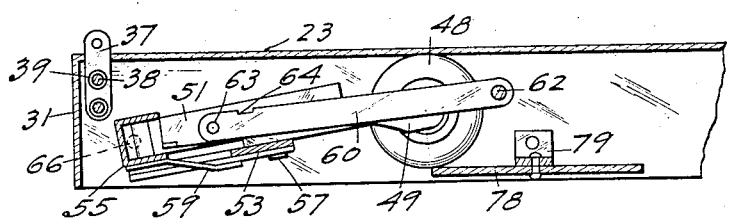
Fig. 10 is a sectional view showing the two wheel truck folded within the housing.
Figure 11:
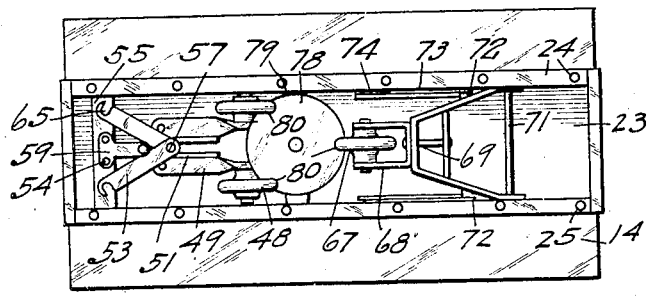
Fig. 11 is a bottom view showing the trucks folded within the housing.
Figure 12:
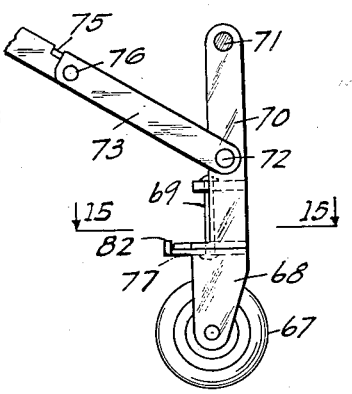
Fig. 12 is a side elevation of the single wheel truck.
Figure 13:
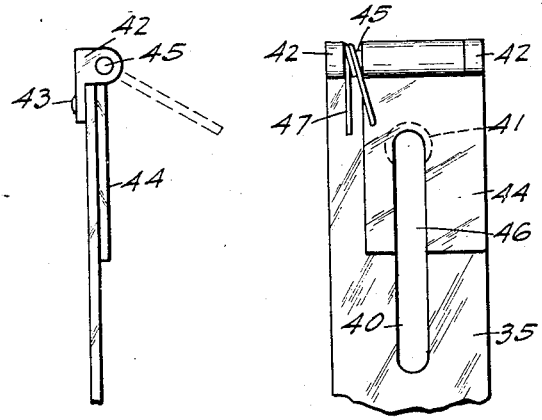
Fig. 13 is an enlarged fragmentary side elevation of the end strut and lock.
Figure 14:
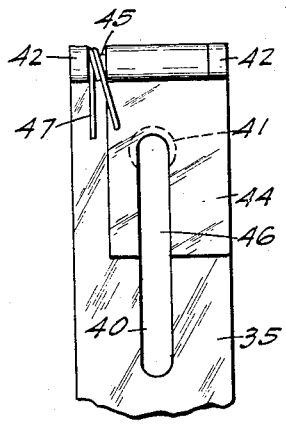
Fig. 14 is a front elevation of Fig. 13.
Figure 15:
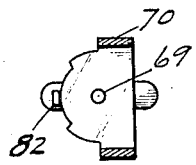
Fig. 15 is a section taken on line 15—15 of Fig. 12.

The operation of the device is as follows: With the bag in folded position as indicated in Fig. 1, the straps 19 are unbuckled and the bag permitted to open. The end reenforcements 35 are then turned upward from their folded position as shown in Fig. 9, to the position shown in Figs. 3 and 4 and the aperture 41 passed over the head of rivet 16, which is then allowed to slide downwardly in slot 40. The leaf 44 is then turned down as indicated in full lines in Fig. 13. The reenforcing strips 33 are then turned from the dotted position shown in Fig. 5 to a vertical position, and the ends clipped onto the rivets 34. The bag is thus reenforced and self supporting. The false bottoms 26 are next folded down and the braces 29 clipped over pins 30. The trucks are next swung outwardly as indicated in Figs. 2, 8 and 9, the knee braces 60 and 73 drawn outward as far as they are permitted by stops 64 and 75, the cross member 53 straightened and the spring member 59 clipped over the pin 57, the slotted ends 65 of cross member 53 cooperating with rivets 52, the members 53 being pivotally connected to the angles 56 which are fixedly secured on the struts 51.

The bag then is in completely unfolded and operable condition, as indicated in Fig. 2.

It will be noted that variations in construction and arrangement of parts which are consistent with the spirit of the appended claims may be resorted to without detracting from the spirit or scope of the invention or sacrificing any of its advantages.

What I claim is:

1. A vehicular traveling bag adapted to be formed into a roll comprising a bag of flexible material provided with end and edge reinforcements of rigid material, said reinforcements being hinged to fold into the bottom of said bag, an inverted box-like housing mounted in the bottom of said bag, folding wheeled trucks mounted to fold completely within said housing, and means for securing the bag in rolled form.

2. A vehicular traveling bag adapted to be formed into a roll, comprising a bag of flexible material provided with folding end and edge reinforcements of rigid material, an inverted box-like housing mounted longitudinally in the bottom of said bag, rigid bottom plates hinged to said housing and adapted to fold against the sides of said housing, a single wheel truck for one end of said housing, a two wheeled truck for the other end of said housing, said trucks being pivotally mounted within said housing and adapted to be folded therein, and means for retaining said trucks within said housing.

3. A vehicular traveling bag comprising a bag of flexible material provided with longitudinal reinforcement at the top and bottom edges, folding reinforcement at the vertical edges, folding end reinforcements, a hinged bag closure frame having the hinge pivots thereof slidably and detachably connected to said folding end reinforcements, an inverted box-like housing secured in the bottom of said bag, auxiliary bottom reinforcing plates hinged on said housing and adapted to fold against the bottom between said housing and the sides of said bag and adapted to be folded against the sides of said housing, a two wheeled truck pivotally mounted within one end of said housing, a single wheel truck pivotally mounted within the other end of said housing, said trucks being completely foldable within the housing and adapted to be extended and rigidly braced to provide a three wheeled conveyance.

4. A vehicular traveling bag comprising a flexible bag, top and bottom edge reinforcing members therefor, a rigid hinged closure frame mounted in the top of the bag, an open bottom rectangular housing mounted in the bottom of the bag, end reinforcing members hingedly mounted at one end on said housing and adapted to cooperate with the hinged pivots of said closure frame, side edge reinforcements pivoted to the bottom reinforcements, brackets hingedly mounted within the opposite ends of said housing and adapted to be extended and rigidly braced, one of said brackets having a wheel rotatably mounted on each side thereof, the other of said brackets comprising an upper portion and a lower portion pivoted together on a vertical axis, the lower portion having a single wheel mounted for rotation on a horizontal axis and means for limiting the movement of one of said portions relative to the other portion.

5. A vehicular traveling bag comprising a flexible bag provided with rigid top and bottom edge reinforcing, a hinged closure frame mounted longitudinally about the top of the bag and provided with inwardly extending shouldered pivots, a side edge reinforcing member having one end pivotally secured to the bottom edge reinforcing, adjacent each side edge of the bag, the other end of each of said members being slotted to cooperate with inwardly extending shouldered pins mounted in the top edge reinforcing, a housing mounted in the bottom of said bag and having an open bottom, an end reinforcing member in detachable slotted engagement with each of said closure frame pivots and hingedly connected to said housing, said housing being rectangular in form, bottom reinforcing members hingedly connected to the bottom flanges of said housing and adapted to fold against the sides of said housing, brackets pivotally mounted within each end of said housing, hinged braces cooperating between said housing and said brackets, a pair of spaced wheels mounted on one of said brackets, and a single wheel mounted in a U-shaped member vertically pivoted in the other bracket, means for limiting the pivotal movement of said U-shaped member, said wheels and brackets being foldable within said housing.

In testimony whereof I affix my signature.

JOHN B. PINHEIRO.